United States Patent [19]

Fritz et al.

[11] Patent Number: 5,345,328
[45] Date of Patent: Sep. 6, 1994

[54] TANDEM RESONATOR REFLECTANCE MODULATOR

[75] Inventors: Ian J. Fritz; Joel R. Wendt, both of Albuquerque, N. Mex.

[73] Assignee: Sandia Corporation, Albuquerque, N. Mex.

[21] Appl. No.: 929,273

[22] Filed: Aug. 12, 1992

[51] Int. Cl.$^5$ .................................. G02F 1/21
[52] U.S. Cl. .................................. 359/248; 359/245; 359/260; 359/263
[58] Field of Search ............... 359/245, 248, 260, 263

[56] References Cited

U.S. PATENT DOCUMENTS 4,790,634  12/1988  Miller et al. ................. 359/260
5,105,301  4/1992  Campi ........................ 359/245

FOREIGN PATENT DOCUMENTS 0492591  7/1992  European Pat. Off. ......... 359/245
2237889  5/1991  United Kingdom ........... 359/245 X

OTHER PUBLICATIONS

High–Contrast Reflection Modulation at Normal Incidence in Asymmetric Multiple Quantum Well Fabry–Perot Structure, Elec. Letter, Apr. 27, 1989, vol. 25, No. 9.
Low–Voltage Multiple Quantum Well Reflection Modulator with On:Off Ratio >100:1, Elec. Letters, Jul. 20, 1989, vol. 25, No. 15.
Reflectance Modulator Based on Tandem Fabry–Perot Resonators, I. J. Fritz, J. F. Klem, J. R. Wendt, Appl. Phys. Lett. 59(7), Aug. 12, 1991.
Thin–Film Optical Filters, Second Edition, H. A. Macleod, Macmillan Publish. Co., New York, Adam Hilger Ltd., Bristol.

Primary Examiner—Edward K. Look
Assistant Examiner—Michael S. Lee
Attorney, Agent, or Firm—George H. Libman

[57] ABSTRACT

A wide band optical modulator is grown on a substrate as tandem Fabry-Perot resonators including three mirrors spaced by two cavities. The absorption of one cavity is changed relative to the absorption of the other cavity by an applied electric field, to cause a change in total reflected light, as light reflecting from the outer mirrors is in phase and light reflecting from the inner mirror is out of phase with light from the outer mirrors.

16 Claims, 5 Drawing Sheets

5,345,328

TANDEM RESONATOR REFLECTANCE MODULATOR

The United States Government has rights in this invention pursuant to Contract No. DE-AC04-76DP00789 between the Department of Energy and American Telephone and Telegraph Company.

BACKGROUND OF THE INVENTION

This invention is a relatively wide-band electrically tunable reflector structure consisting of tandem Fabry-Perot resonators grown as a single epitaxial device.

Reflectance modulators are useful elements for bidirectional optical communication systems, for optical interconnection of integrated circuits in computer systems, and for optical logic applications. Optoelectronic devices incorporating epitaxially grown Fabry-Perot cavities are becoming increasingly important as reflectance modulators. For example, an electrically controlled reflectance modulator based on electro-optic effects in multiple quantum well (MQW) cavity structures has been described by Whitehead et al., Electronics Letters, Vol. 25, No. 9, Apr. 27, 1989, page 566, and Vol. 25, No. 15, Jul. 20, 1989, Page 984.

There are several characteristics that have limited the practical development of reflectance modulators. These characteristics include the highly precise control of layer thickness and composition required to attain operation at a given wavelength, and temperature dependences in the Fabry-Perot resonance and the MQW electro-optic properties that cause temperature variations of the optimum operating wavelength and of the contrast ratio.

While tandem resonators have been used to improve performance of optical bandpass filters by increasing their bandwidth for high transmission and their rejection outside the passband, H. Macleod, Thin-Film Optical Filters, (MacMillan, New York, 1986) Chapter 7, prior to this invention the use of tandem Fabry-Perot cavities for reflectance modulation has not been demonstrated. The invention recognizes the unique relationship of the reflections from the three mirrors that enables the tandem resonators to be used as a wideband modulator.

SUMMARY OF THE INVENTION

It is an object of this invention to have a wide bandwidth electrically tunable reflectance modulator.

It is another object of this invention to have an epitaxially grown tandem cavity modulator.

It is still another object of this invention to reduce the sensitivity of a tunable reflectance modulator to variations in material parameters and to temperature effects.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a wide band optical modulator comprising a substrate and tandem Fabry-Perot resonators epitaxially grown on said substrate comprising three mirrors spaced by two cavities, the absorption of one cavity being changed relative to the absorption of the other cavity by an applied electric field, light reflecting from the outer mirrors being in phase and light reflecting from the inner mirror being out of phase with light from the outer mirrors.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figures 1, 1A:
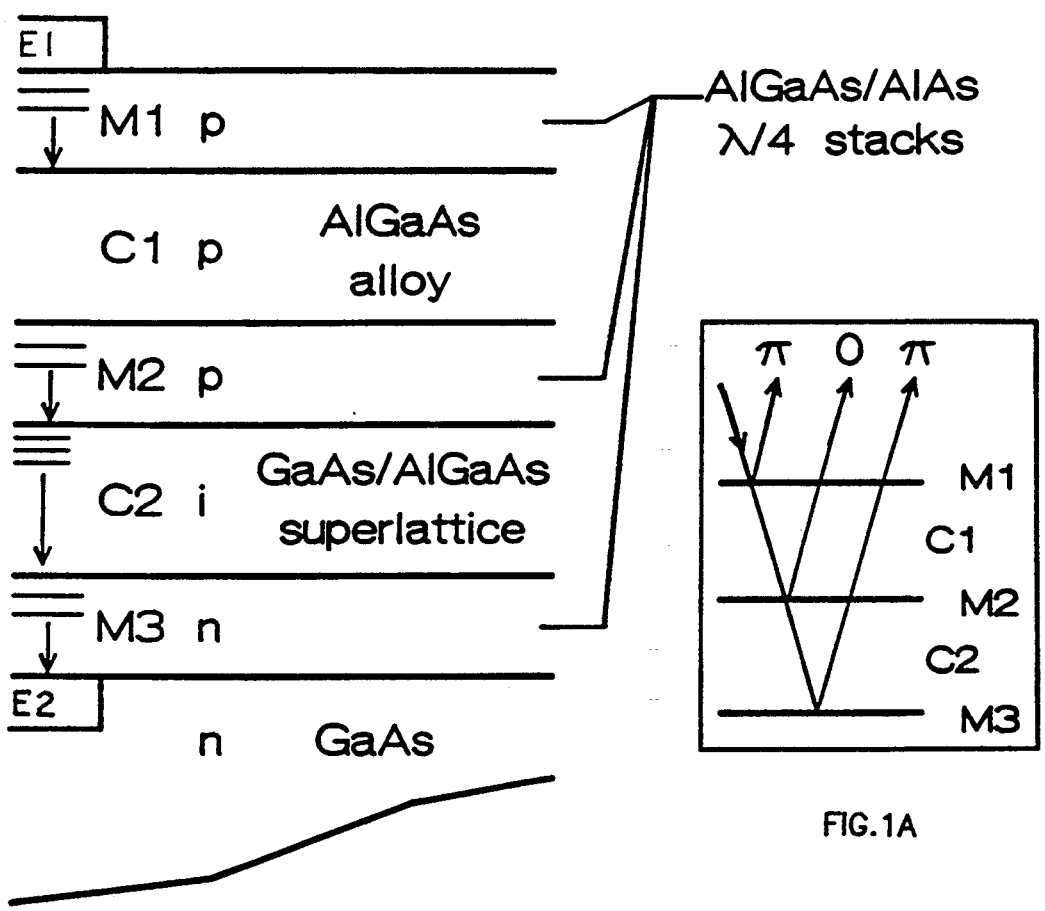
FIG. 1 shows a schematic of a tandem Fabry-Perot reflectance modulator in accordance with a preferred embodiment of the invention.
FIG. 1A shows the principal rays reflected at the Fabry-Perot resonant wavelength of the structure of FIG. 1.

FIG. 1 shows a schematic representation of a preferred embodiment of the tandem Fabry-Perot reflectance resonator to include three mirrors (M1, M2, M3) spaced from each other by two cavities (C1, C2). Typically, the absorption of one cavity is modified by the application of an electric field to the device, thereby causing modulation of the light reflected from the device.

In accordance with the invention, each mirror may consist of a quarter-wave Bragg-reflector stack of alternating Group III-V semiconductor materials such as AlGaAs and AlAs layers having a high reflectance zone centered at a Bragg wavelength $\lambda_B$. Other mirror materials, such as dielectrics, could also be used in the invention.

One cavity, such as top cavity C1, is not responsive to the applied electric field and may comprise a single layer of a AlGaAs alloy or other epitaxial material having an appropriate optical thickness. A strained-layer-superlattice structure could also be grown for this cavity, although a single layer is preferred because it is easier to construct.

The other cavity, bottom cavity C2 in the preferred embodiment, changes absorption with an applied electric field. As shown, C2 is an MQW structure with wells formed of materials such as GaAs and barriers formed, for example, of AlGaAs. Each cavity has an optical thickness of an integral multiple of $\lambda_B/2$, resulting in a desired Fabry-Perot resonance $\lambda_0$ of each cavity at the Bragg wavelength ($\lambda_0 = \lambda_B$). A thickness of $2\lambda_B$ was used in the preferred embodiment discussed herein.

As further shown in FIG. 1, the structure of the invention may be epitaxially grown on a substrate such as GaAs. Mirrors M1 and M2, and cavity C1, are p-doped while cavity C2 is undoped and mirror M3 is n-doped. A voltage may be applied across electrodes E1, on either mirror M1 or cavity C1, and E2, on the substrate, to modulate the reflectance of the device, as discussed hereinafter.

FIG. 1A is a simplified representation of the principal rays reflected from the structure of FIG. 1 at $\lambda_0$. Incident light I strikes M1 where a portion RE1 is reflected and a portion TR1 is transmitted through C1 to M2, where a portion RE2 is reflected and a portion TR2 is transmitted through C2 to M3, where a portion RE3 is reflected. As is usual with Fabry-Perot structures at resonance, RE1 and RE2 are 180° out of phase while RE1 and RE3 are in phase. Of course, a portion of RE2 also reflects from the underside of M1, and a portion of RE3 reflects from both M2 and M1, and these reflections are further reflected from the other mirrors. Because of these further reflections, the output of the structure of FIG. 1 is a function of the sum of RE1, RE2, and RE3.

The operation of this invention is based on a principal extending the asymmetric Fabry-Perot (ASFP) modulators of Whitehead et al. The mirror reflectivities have been designed so that RE1 plus RE3 is somewhat larger than RE2. (Mirror reflectivity is a function of mirror materials and thickness.) With no electric field applied, the absorption in C2 is small. As a result, the total reflected intensity at $\lambda_0$ is high; i.e., most light impinging M1 is reflected with little change. However, as an electric voltage is applied across the electrodes, an electric field is applied across undoped cavity C2, causing absorption in C2 induced by the quantum-confined Stark effect in the quantum wells. As the absorption in C2 increases, RE3 decreases, and the intensity at $\lambda_0$ decreases towards zero as RE1 plus RE3 balances the opposite phase intensity RE2.

In the preferred embodiment disclosed, C1 does not change absorption because of the applied voltage as no electric field exists in this p-doped cavity.

A prototype structure to demonstrate reflectance modulation near 870 nm based on the principles discussed above has been constructed. Details of the layer thicknesses, layer compositions and the number of layers in the various mirror and cavity regions are given in Table I, which shows individual layer compositions x in $Al_xGa_{1-x}As$, layer thicknesses d, and number of layers m for the three mirror elements and two cavity elements of the double Fabry-Perot structure. The alternating sublayers which comprise mirrors M1, M2, M3 and cavity C2 are indicated by subscripts A and B. Cavity C1 is a single layer.

TABLE I

| Element | Sublayer A | | | Sublayer B | | |
|---|---|---|---|---|---|---|
| | $x_A$ | $d_A$(nm) | $m_A$ | $x_B$ | $d_B$(nm) | $m_B$ |
| M1 | 0.3 | 63.6 | 3 | 1.0 | 72.5 | 3 |
| C1 | 0.15 | 496 | 1 | — | — | — |
| M2 | 0.3 | 63.6 | 9 | 1.0 | 72.5 | 10 |
| C2 | 0 | 12.1 | 21 | 0.3 | 12.1 | 20 |
| M3 | 0.3 | 63.6 | 14 | 1.0 | 72.5 | 15 |

The refractive indices used to determine the layer thicknesses were taken from the literature. (M. Afromowitz, Solid State Commun. 15, 59 (1974) and references therein.) The mirrors M1, M2, and M3 have designed reflectivities of 58%, 75%, and 92%, respectively. The bulk refractive index for the average composition of the two layer materials was used to estimate the required thickness of the superlattice cavity. The experimental results discussed hereinafter indicate this procedure may produce errors of ~1%. The quantum wells in C2 were designed to have an excitonic band edge at ~860 nm, based on a two-band envelope-function model calculation. Each cavity is $2\lambda_0$ thick (~0.5 μm).

Figure 2A:
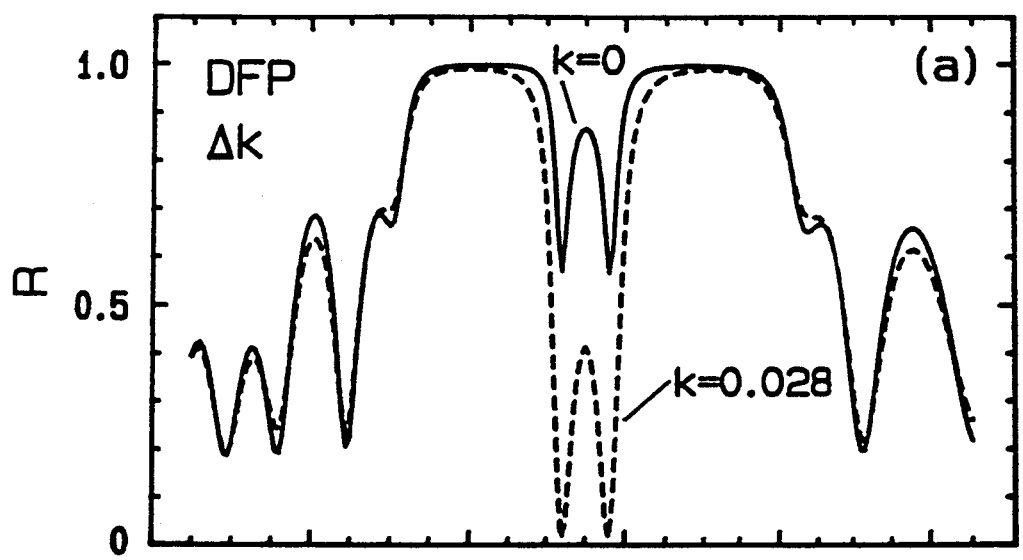
FIG. 2A shows computer-generated simulations of reflectance spectra with different extinction coefficients for the device described in FIG. 1.
Figure 2B:
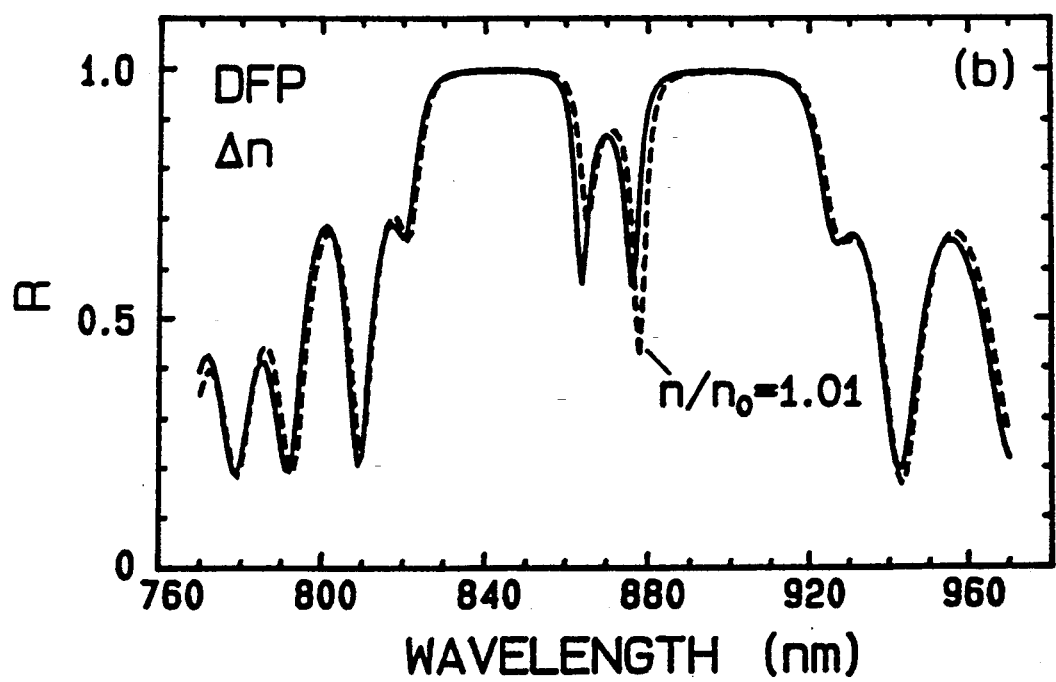
FIG. 2B shows the simulations of the device of FIG. 1 with a slight mismatch in the optical path of the two cavities.

The behavior of double-cavity structures was studied theoretically with the aid of computer simulations based on a matrix-method calculation, a known technique which accounts for the multiple reflections within the device. A wavelength-independent extinction coefficient was used to investigate the effect of absorption in the superlattice layers of cavity C2, allowing the effect of absorption at any wavelength to be evaluated from a single calculation. Results from some typical computer simulations are shown in FIG. 2. The solid lines are the calculated reflectance spectrum, with no absorption, for the structure described above. The double-dipped shape is characteristic of tandem-cavity structures. The dashed line in FIG. 2A shows the effect of absorption in the cavity C2 for a wavelength-independent extinction coefficient of k=0.028. This corresponds to an absorption coefficient of $\alpha = 4 \times 10^3$ cm$^{-1}$ at the Bragg wavelength. The dashed line in FIG. 2B gives the reflectance spectrum when the refractive index in the cavity C2 is increased by 1% over the index in cavity C1, which situation corresponds to the device, as built, due to small inaccuracies in growth conditions and the calculated indices of the SLS layers of cavity C2.

Changes in absorption are highly effective in modulating the reflectivity of these devices. FIG. 2A shows that the central part of the spectrum from 860–880 nm shifts downward nearly uniformly as the absorption is increased to k=0.028. The two side lobes at 864 nm and 876 nm reach R=0 at a slightly higher value of k. As absorption is further increased, the side lobes remain at low R (R<0.05), but they approach each other in wavelength until they meet at $\lambda_0$. Additional increase in k leads to a single minimum in R at $\lambda_0$.

The calculations thus demonstrate that tandem-cavity devices can have near-zero reflectivity over a range of wavelengths. By contrast, in single-cavity ASFP devices, R can reach zero only at $\lambda_0$. It should be possible, therefore, to design tandem-cavity devices that exhibit a high contrast ratio at a specific wavelength independent of small variations in device parameters caused by variable growth parameters and variable operating temperature.

In addition to the matrix-method calculations discussed above, an analytic functional description of the reflectivity of double cavities in the "hard-mirror" approximation has been developed. In this approximation, the distributed Bragg reflectors are replaced by infinitesimally thin mirrors having the same reflectivity. The analytic result at resonance is given by the following expression, which is useful for device design:

$$R_0 = R_1 \left( \frac{R_2 - R_\alpha - R_\beta(1 - R_\alpha)}{R_1(R_2 - R_\alpha) - R_\beta(1 - R_\alpha)} \right)^2,$$

Here, the reflectivities of the three mirrors are designated as $R_1$, $R_2$ and $R_3$, and $R_\alpha = (R_2 R_3)^{\frac{1}{2}} \exp(-\alpha d_2)$ and $R_\beta = (R_1 R_2)^{\frac{1}{2}}$, where $\alpha$ and $d_2$ are, respectively, the absorption coefficient and thickness of the cavity C2.

To demonstrate operation of a double Fabry-Perot resonator as a reflectance modulator, a structure having the layer sequence described in FIG. 1 and Table I was grown by standard computer-controlled molecular-beam epitaxy techniques. It was subsequently fabricated into p-i-n mesa diodes using photolithographic techniques. In this processing, the top contact was recessed into cavity C1 to reduce the series resistance of the device. The best devices exhibited reverse breakdown voltages of over 14 V, far exceeding the −5 V bias needed for maximum reflectance modulation.

Data from the first Fabry-Perot device are presented in FIGS. 3A–3D. Reflectivity versus wavelength at near-flatband conditions (electric field F=0) is given in FIG. 3D. The characteristic double-dipped cavity resonance is centered near $\lambda_0 = 880$ nm, slightly higher than the design wavelength of 870 nm. The Fabry-Perot resonance is skewed similar to that in the simulation of FIG. 2B, suggesting a slight (∼1%) mismatch in the optical path lengths of the two cavities. This mismatch may stem from the approximation of using an average of bulk refractive indices for the superlattice index. The band-edge exciton of the superlattice cavity is seen as a small dip in the reflectivity spectrum at 858 nm.

Figure 3A:
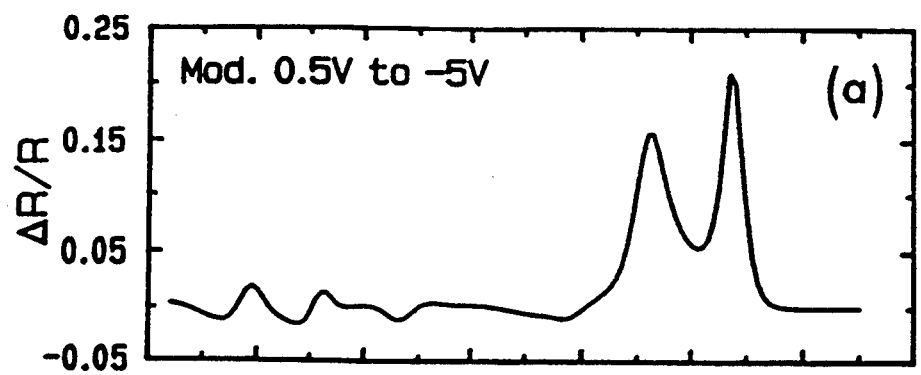
FIG. 3A-3D show experimental results from a tandem Fabry-Perot device grown by molecular beam epitaxy.
Figure 3B:
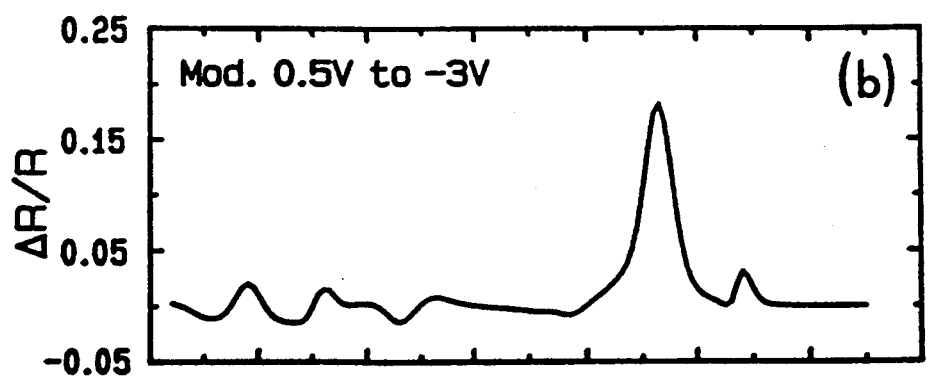
Figure 3C:
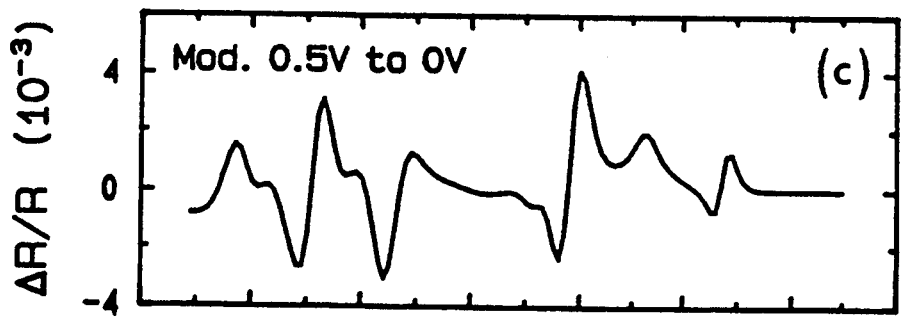
Figure 3D:
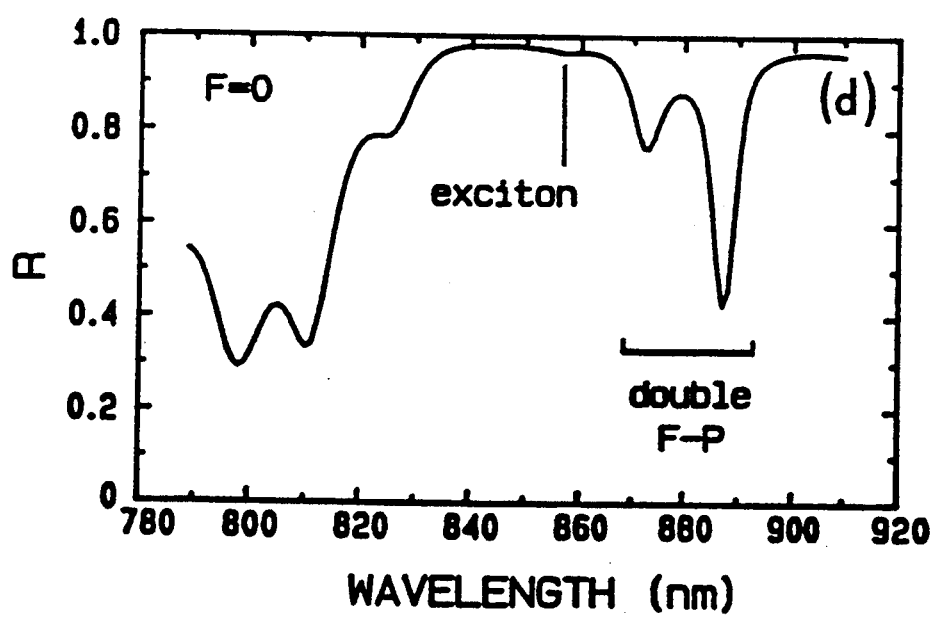

The fractional modulated reflectivity $\Delta R/R$ under three modulation conditions is shown in FIGS. 3A–3C. $\Delta R/R$ is shown as positive when R increases with increasing forward bias. The low-signal response shown in FIG. 3C is similar to electroreflectance spectra studied in other multilayered high reflectance structures. The strongest feature is the band-edge exciton at 858 nm.

FIG. 3B shows $\Delta R/R$ for modulation to −3 V, corresponding to a field of $F=7\times 10^4$ V/cm. At this field the band edge is Stark shifted to the position of the first dip in the Fabry-Perot response, at 873 nm. The resultant peak value of $\Delta R/R$ is ∼18%. With increased modulation depth the remainder of the Fabry-Perot resonance (to ∼893 nm) contributes to the modulated reflectivity. FIG. 3A illustrates the largest modulation levels observed for our sample. The peak $\Delta R/R$ is slightly over 20% with modulation from +0.5 V to −5 V. The applied field is $F=1.1\times 10^5$ V/cm at this bias value.

In conclusion, this invention demonstrates reflectance modulation in a double-cavity Fabry-Perot structure. Measurements on a low-insertion-loss device are in qualitative agreement with computer simulations based on the matrix method and with simplified analytical modeling. Calculations suggest that devices optimized for high contrast ratio may be able to achieve low reflectivity over a range of wavelengths, providing a margin of tolerance for non-optimal layer thicknesses or compositions, as well as for temperature variation. The device also operates as a transmission modulator, as reflectance and transmittance are related to each other, and double-cavity devices could be designed to optimize performance in the transmission mode.

The particular sizes and equipment discussed above are cited merely to illustrate a particular embodiment of this invention. It is contemplated that the use of the invention may involve different components as long as the principle, using tandem Fabry-Perot resonators in a reflectance modulator, is followed. For example, the upper cavity could be designed to change absorption with applied electric field, with the device reflectivity changing from mostly RE1 when the upper cavity is absorbing to a sum of RE1, RE2, and RE3 when it is transmitting. In addition, it is contemplated that more than three mirrors and two cavities could be placed in tandem in the practice of the invention. Furthermore, modulated attenuation could be achieved by using a modulated mirror M2 or M3 having a strained layer superlattice or other appropriate construction. It is intended that the scope of the invention be defined by the claims appended hereto.

We claim:

1. A wide band optical modulator comprising:
   a substrate;
   tandem Fabry-Perot resonators epitaxially grown on said substrate, comprising:
      three mirrors, M1, M2, and M3, each mirror having a high reflectance zone centered at a Bragg wavelength $\lambda_B$, M3 being adjacent said substrate; and
      two cavities, C1 and C2, spaced from each other by M2 in a stack grown on M3, M1 being on top of said stack, the absorption of C2 being changed relative to the absorption of C1 by an applied electric field,
   wherein light reflecting from M1 and M3 is in phase and light reflecting from M2 is out of phase with light from M1 and M3.

2. The optical modulator of claim 1 wherein C2 is between M3 and M2.

3. The optical modulator of claim 2 wherein each mirror consists of a quarter-wave Bragg-reflector stack of alternating Group III-V materials.

4. The optical modulator of claim 3 wherein C1 consists of a single layer of a p-doped alloy of Group III-V materials.

5. The optical modulator of claim 4 wherein C2 consists of a superlattice of alternating layers of undoped Group III-V materials.

6. The optical modulator of claim 5 further comprising means for applying an electric field to C2.

7. The optical modulator of claim 6 wherein said means comprise electrodes for applying an electric potential across said stack.

8. The optical modulator of claim 2 wherein the reflectivity of M1 is less than the reflectivity of M2 which is less than the reflectivity of M3.

9. A wide band optical modulator epitaxially grown as a stack on a substrate, said modulator comprising:
   first means for reflecting a portion RE1 of incident light on said modulator and for transmitting another portion TR1;
   second means for reflecting a portion RE2 of TR1 and for transmitting another portion TR2, wherein RE2 is 180° out of phase with RE1;
   third means for reflecting a portion RE3 of TR2, wherein RE3 is in phase with RE1; and
   means for modulating the intensity of TR2, wherein the output of said modulator is a function of RE1+RE2+RE3.

10. The optical modulator of claim 9 wherein said first means comprises a mirror, said second means comprises a second mirror spaced from said first means by a cavity forming a Fabry-Perot resonator, and said third means comprises a third mirror spaced from said second mirror by a second cavity forming a second Fabry-Perot resonator.

11. The optical modulator of claim 10 wherein said second cavity is a multiple quantum well structure defining said means for modulating.

12. The optical modulator of claim 11 wherein each mirror consists of a quarter-wave Bragg-reflector stack of alternating Group III-V materials.

13. The optical modulator of claim 12 wherein the first cavity consists of a single layer of a p-doped alloy of Group III-V materials.

14. The optical modulator of claim 13 wherein the second cavity consists of a superlattice of alternating layers of undoped Group III-V materials.

15. The optical modulator of claim 14 further comprising means for applying an electric field to the second cavity.

16. The optical modulator of claim 15 wherein said means for applying an electric field comprise electrodes for applying an electric potential across said stack.

* * * * *